United States Patent [19]
Chiu

[11] Patent Number: 5,244,228
[45] Date of Patent: Sep. 14, 1993

[54] COLLAPSIBLE DEVICE FOR A BABY CARRIAGE

[75] Inventor: Hsiu-Hui Chiu, Tainan Hsien, Taiwan

[73] Assignee: SunShon Molding Co., Ltd., Tainan Hsien, Taiwan

[21] Appl. No.: 14,570

[22] Filed: Feb. 8, 1992

[51] Int. Cl.$^5$ .............. B62B 9/24; B62B 7/06
[52] U.S. Cl. .................. 280/642; 280/650; 280/47.4; 403/91; 403/101
[58] Field of Search ........ 280/642, 647, 650, 658, 280/47.38, 47.4; 403/91, 92, 101, 102

[56] References Cited

U.S. PATENT DOCUMENTS

| | | | |
|---|---|---|---|
| 4,191,397 | 3/1980 | Kassai | 280/647 |
| 4,216,974 | 8/1980 | Kassai | 280/650 X |
| 4,544,178 | 10/1985 | Al-Sheikh et al. | 280/642 |
| 4,993,743 | 2/1991 | Takahashi et al. | 280/647 X |

FOREIGN PATENT DOCUMENTS 2603240 3/1988 France ................ 280/642

Primary Examiner—Brian Johnson
Attorney, Agent, or Firm—Morton J. Rosenberg; David I. Klein

[57] ABSTRACT

A collapsible device for a baby carriage has a locking disc as a male joint fixed with an inverted U-shaped push rod and a female joint fixed with each of the ends of a protective rod combined together and locked or unlocked by a push button fitted in the female joint. A locking block deposited and moved back and forth in a chamber in the female joint to engage or disengage from the locking disc so that the female joint can be locked together or unlocked from the locking disc so as to swing up the protective rod relative to the push rod for collapsing the baby carriage.

1 Claim, 7 Drawing Sheets

COLLAPSIBLE DEVICE FOR A BABY CARRIAGE

BACKGROUND OF THE INVENTION

A conventional baby carriage generally has a front wheel rod 107, an inverted U-shaped push rod 109 connected with the front wheel rod 107 by means of a female joint 108 and a male joint 112, a rear wheel rod 110 pivotally connected with the push rod 109 and a seat rester 111 fixed with the push rod 109, as shown in FIG. 7. A collapsible function is performed by the male and female joint 112, 108 shown in FIG. 8. The female joint 108 fixed on top of the front wheel rod 107 has a hole 1081 in a top surface and a V-shaped groove 1082 in an inner wall, and the male joint 112 fixed on bottom of the push rod 109 has a tenon 1121 extending down to engage the hole 1081, and a projection on a side wall to engage the inverted V-shaped groove 1082, and thus both the male and the female joint 112, 108 lock the front wheel rod 107 and the push rod 109 firmly for use. The collapse it, a grip 1123 of the male joint 112 is to be pulled up, disengaging the tenon 1121 from the hole 1081 and then the push rod 109 can be pulled to collapse downwardly down.

SUMMARY OF THE INVENTION

This invention has been devised to offer a more handy and convenient collapsible device for a baby carriage.

The caooapsible device in the present invention includes a locking disc functioning as a male joint combined with the inverted U-shaped push rod, a female joint combined with the front wheel rod, a locking block, a guide block and a push button combined together.

The locking block is deposited and movable back and forth in a chamber in the female joint, having two tenons spaced apart at a rear end to engage or disengage from two fitting grooves in the locking disc to lock or unlock the female joint with or from the locking disc. The push button is placed in a side hole in the female joint to be manually pressed in to move the locking block from a locking position to an unlocking position, by the guide block from a locking position to an unlocking position, by the guide block put in a hole in the female joint and having a top sloped surface to contact and guide a sloped surface of the locking block to move forward to unlock the locking disc from the female joint.

BRIEF DESCRIPTION OF DRAWINGS

The invention will be better understood by reference to the accompanying drawings, wherein:

FIG. 4 is a cross-sectional view on line 4-4 in FIG. 3, showing a push button not pressed in;

FIG. 5 is a cross-sectional view similar to line 4-4 in FIG. 3, showing the push button pressed in;

DESCRIPTION OF THE PREFERRED EMBODIMENTS

Figure 1:
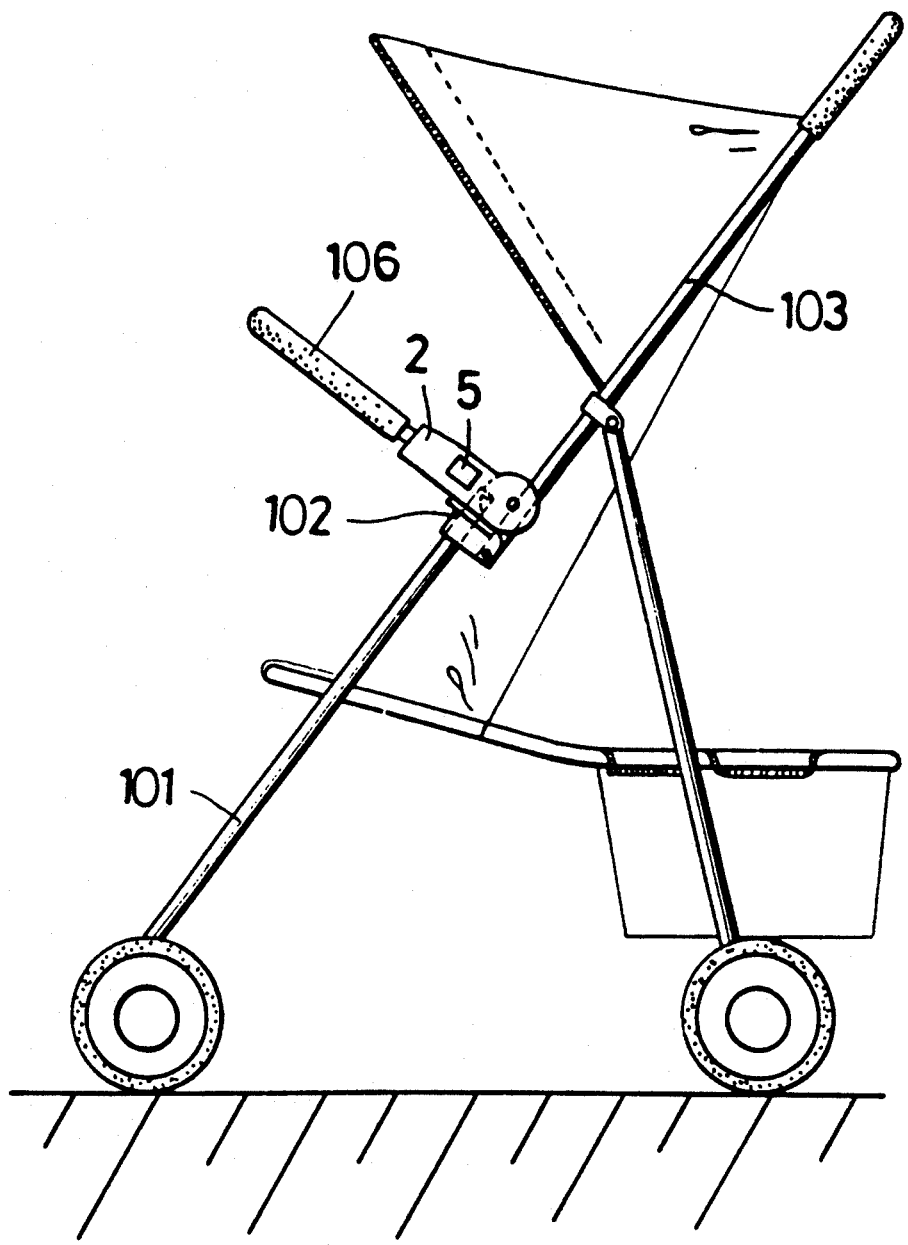
FIG. 1 is perspective view of a baby carriage with a collapsible device in the present invention.
Figure 2:
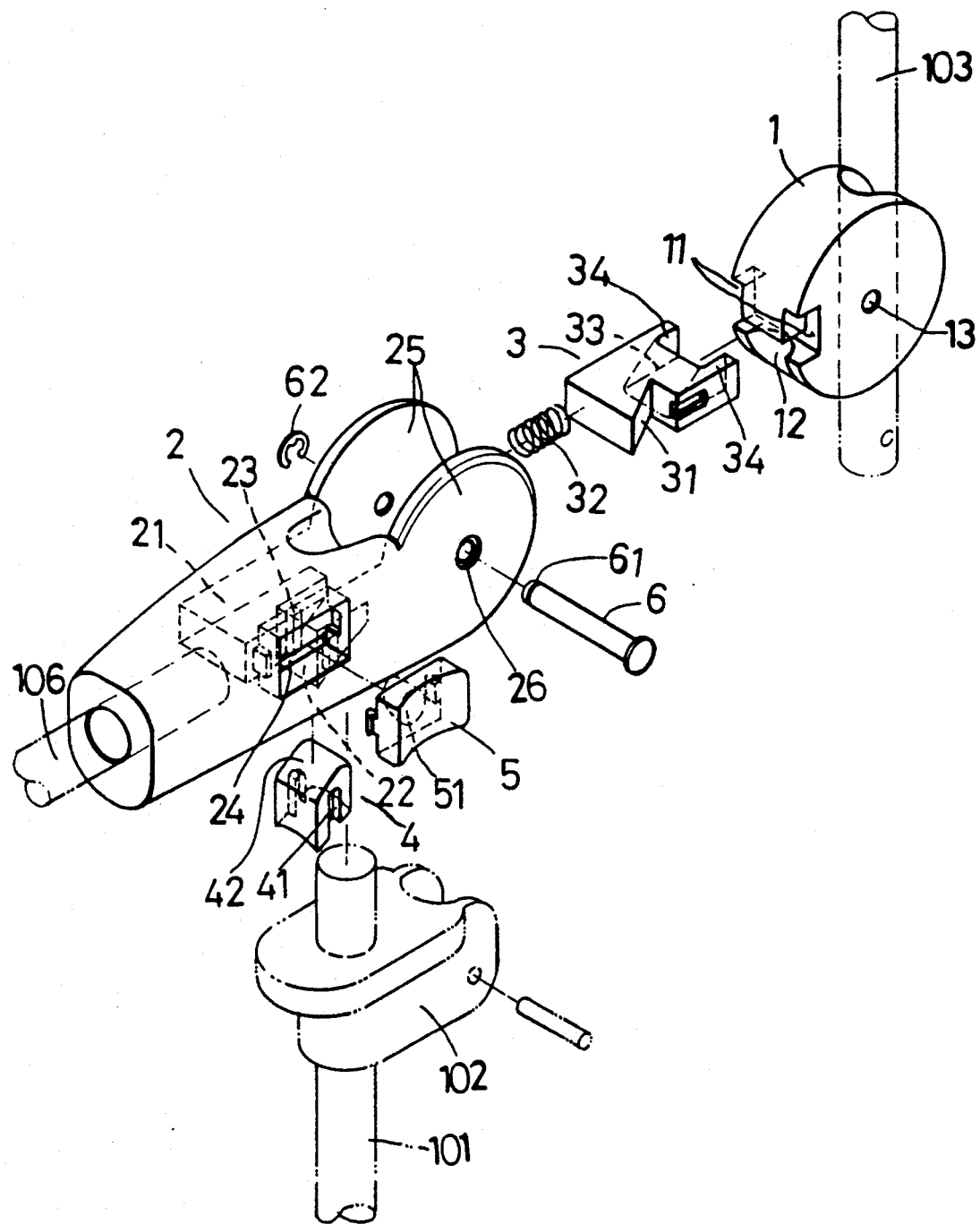
FIG. 2 is an exploded perspective view of the collapsible device for a baby carriage in the present invention.

A collapsible device for a baby carriage in the present invention, as shown in FIG. 1, has a protective lateral rod 106 between a front wheel rod 101 and an inverted U-shaped push rod 103. The front wheel rod 101 and the inverted U-shaped push rod 103 are the same as the conventional collapsible device for a baby carriage. Special features in the present invention are a locking disc 1 whose function is as a male joint pivotally combined with a lower end of the inverted U-shaped push rod 103, and a female joint 2 fixed with both ends of the protective lateral rod 106.

The locking disc 1 has a through hole 13, two fitting grooves 11 at both outward sides of the front portion, an opening 12 at the bottom of the front portion to combine with an upper end 102 of the front wheel rod 101. The female joint 2 has a hollow chamber 21 in its bottom for a locking block 3 and a coil spring 32 elastically pushing the locking block 3 to fit and move therein. The locking block 3 has a slanted surface 31 at a side, an inclined-inward guide surface 33 in a intermediate portion, and two tenons 34, 34 extending forward from both sides of the guide surface 33. The female joint 2 has a vertical aperture 22 in a bottom, two projecting ridges 23, 23 at both sides of the aperture 22 for two grooves 41, 41 of a guide block 4 to fit with. Then the guide block 4 can fit in the aperture 22, having a sloped surface 42 on its top for the guide surface 33 of the locking block 3 to contact and slide thereon. The female joint 2 also has a hole 24 in an outer surface for a push button 5 to fit therein. The push button 5 has a guide post 51 extending inward and having a sloped end surface. The female joint 2 also has a fork portion 25 at one end for the locking disc 1 to insert a middle opening 26 in the fork portion 25, and is pivotally connected together with the locking disc 1 by a pivotal pin 6 fixed by a C-shaped ring 62 engaging an annular groove 61 of the pin 6.

Figure 4:
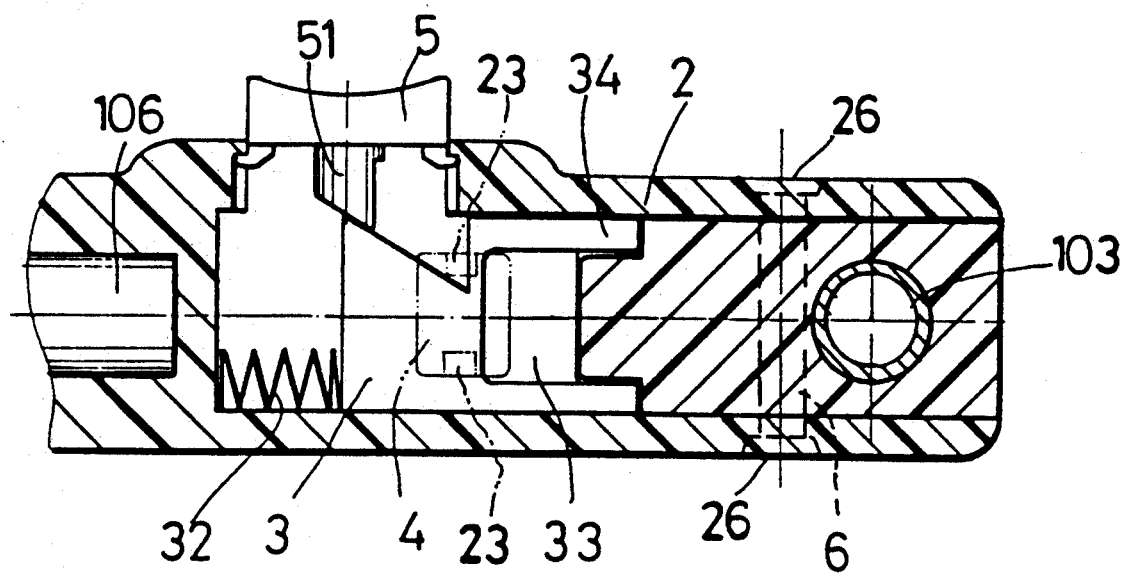
Figure 5:
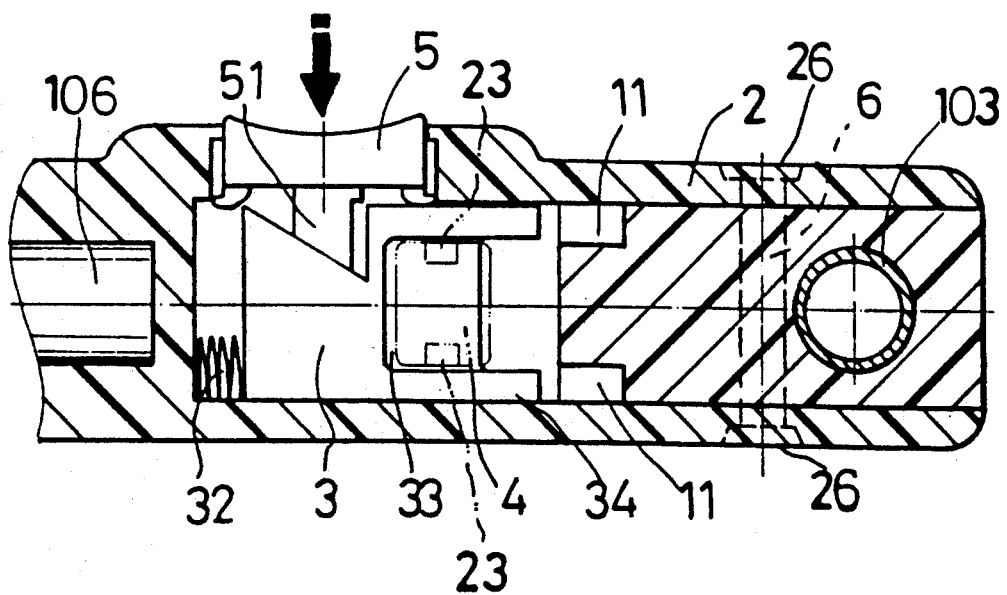

When this collapsible device is to be collapsed from a spread condition (a locked position) for storing away the bay carriage, as shown in FIGS. 4 and 5, the push button 5 in the female joint 2 is to be pressed in, forcing the guide post 51 of the push button 5 to move the locking block 3 to the left side so that the two tenons 34, 34 to separate from the fitting grooves 11, 11 of the locking disc 1. Then the locking disc 1 and the female joint 2 are in an unlocked condition, enabling the protective rod 106 and the inverted U-shaped push rod 103 can be moved upward as shown in FIG. 6 to a collapsed position.

Figure 3:
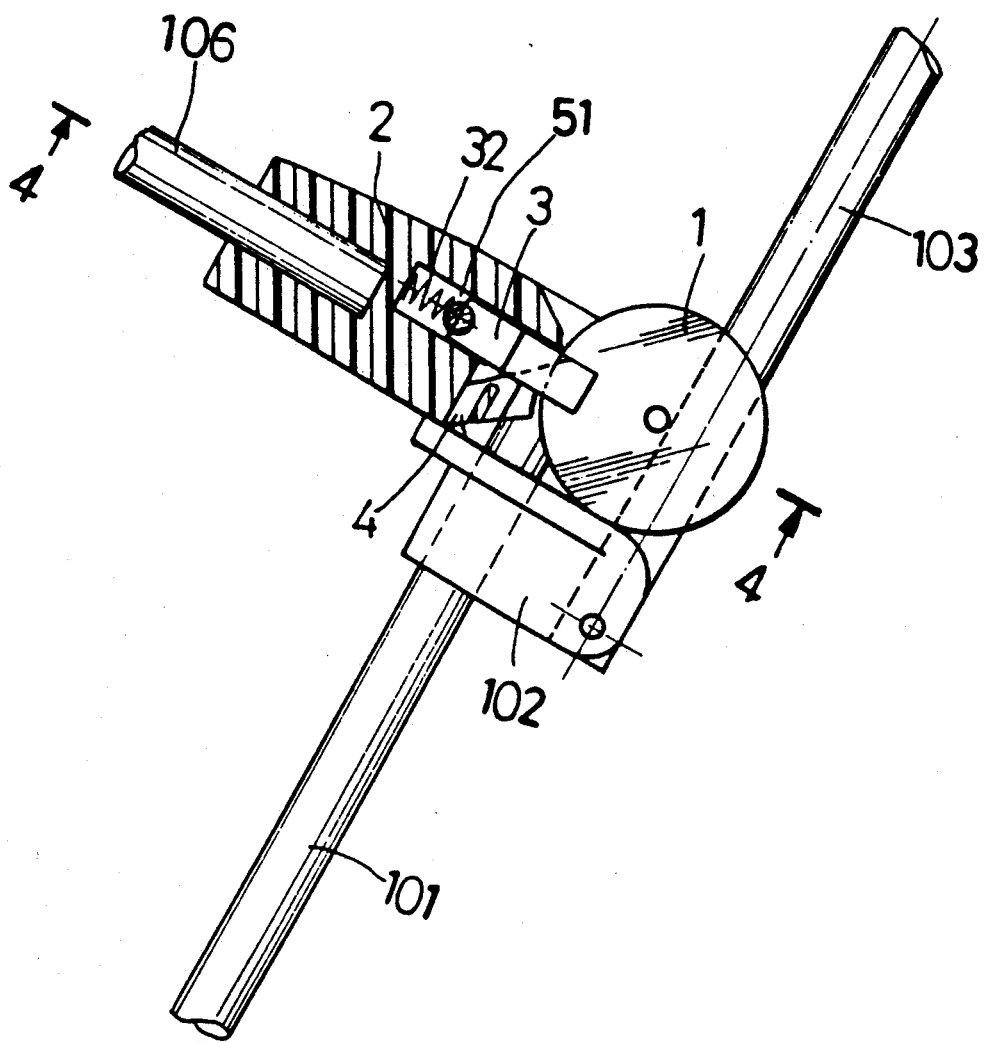
FIG. 3 is a side cross-sectional view of the collapsible device for a baby carriage in the present invention.
Figure 6:
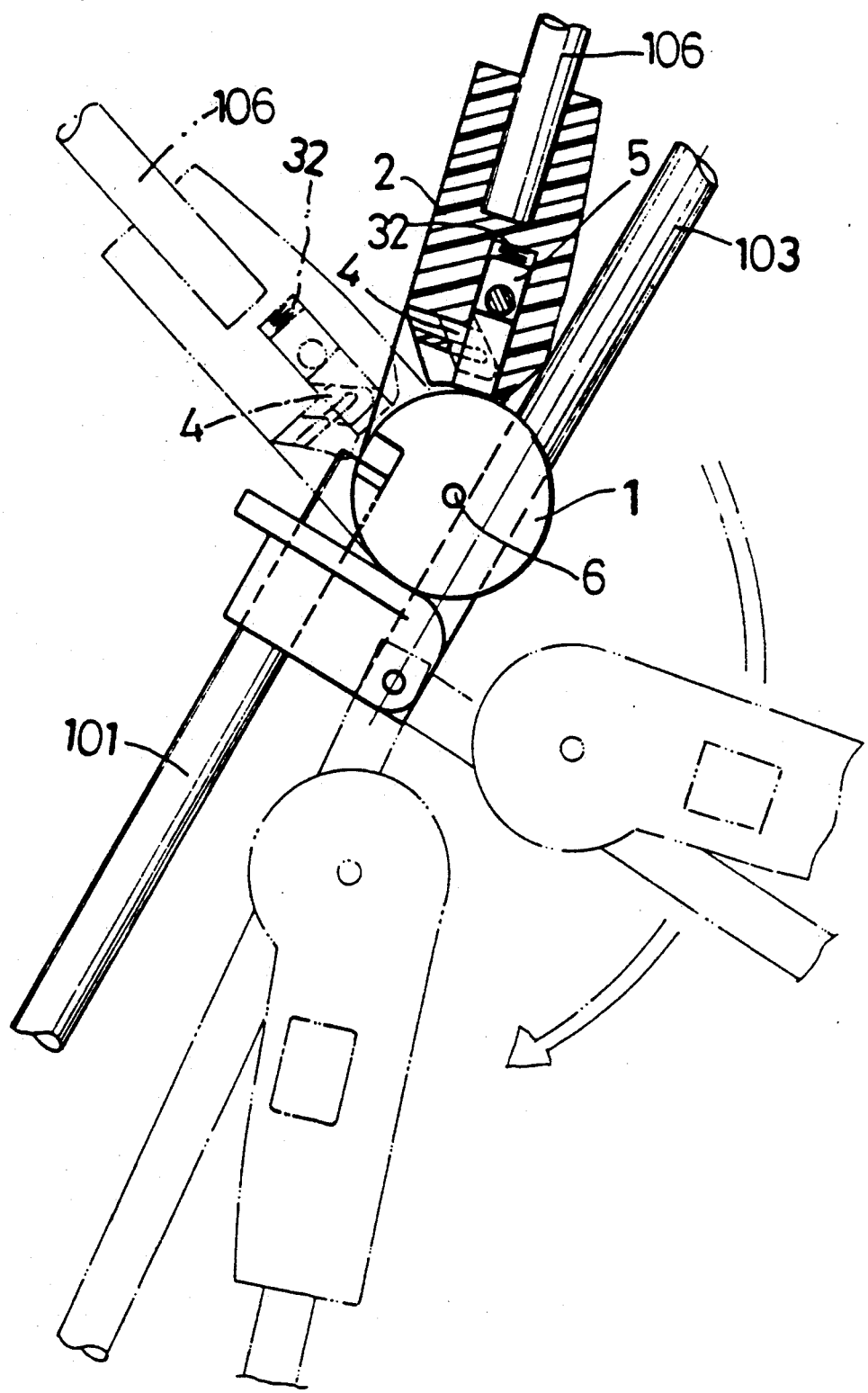
FIG. 6 is a perspective view of the collapsible device for a baby carriage in the present invention, showing how to collapse it.
Figure 7:
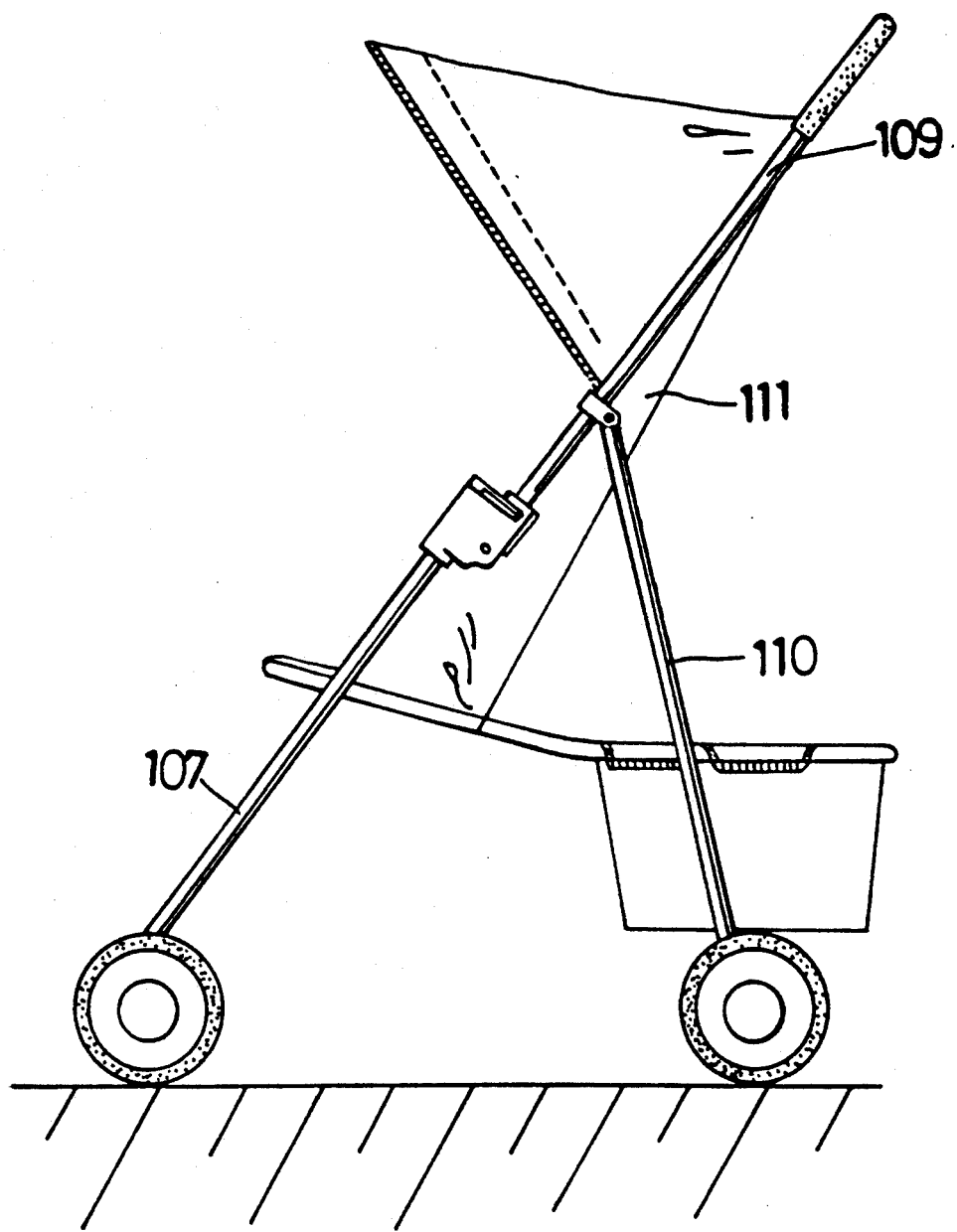
FIG. 7 is a perspective view of a conventional collapsible device for a baby carriage; and, FIG. 8 is a perspective view of a conventional collapsible device for a baby carriage, showing how to collapse it.
Figure 8:
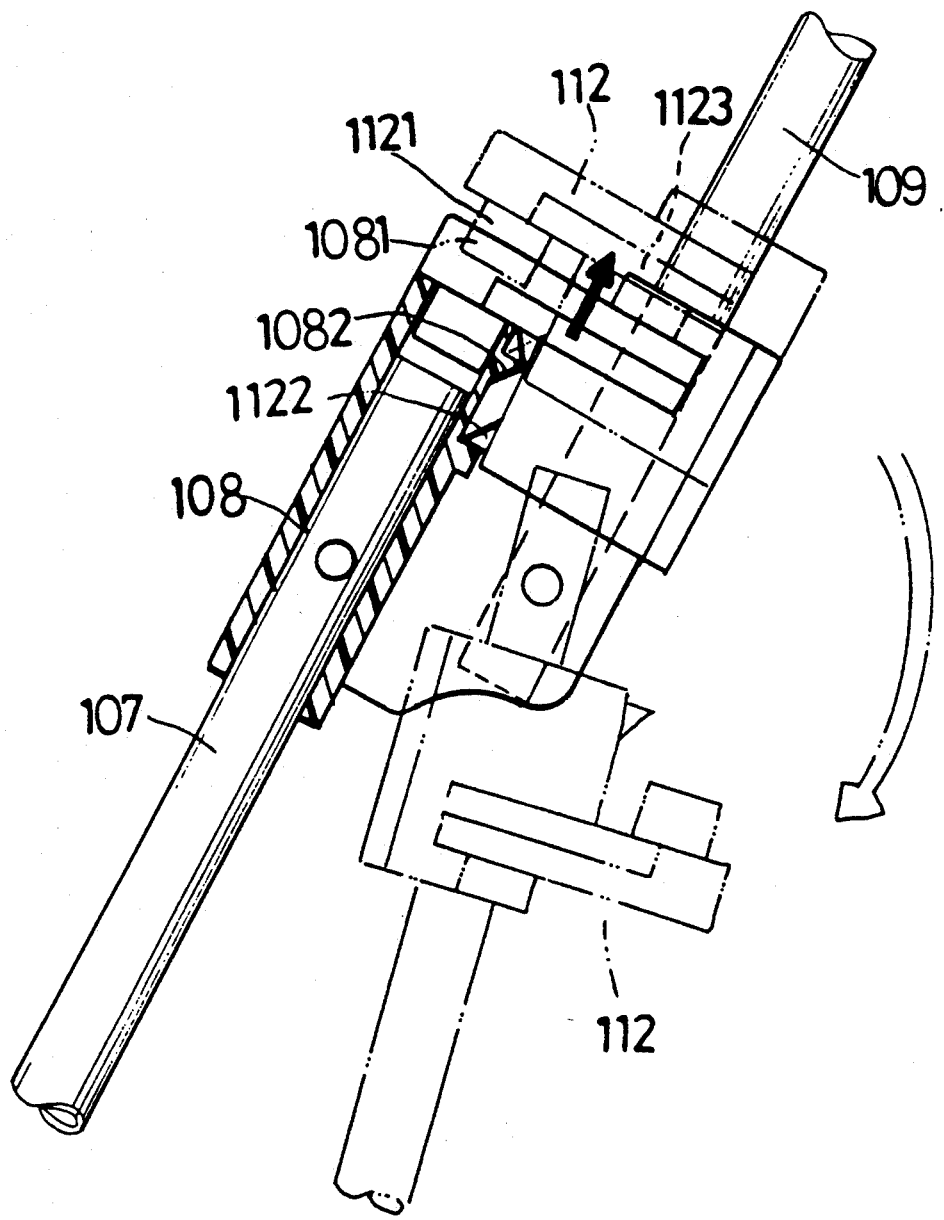

When a baby carriage provided with this collapsible device is to be used, and the protective rod 106 and the inverted U-shaped push rod 103 are to be swung from the collapsed condition shown in FIG. 6 to a usable condition (the locked condition) shown in FIG. 3, the protective rod 106 is manually swung down to the front of the push rod 103, forcing the locking block 3 pushed by the spring 32 to move to the right (outward) and permitting the tenons 34, 34 engaging in the fitting grooves 11, 11 of the locking disc 1. Then both the protective rod 106 and the inverted U-shaped push rod 103 are kept securely with the locking disc 1 and the female joint 2 locked by means of the locking block 3.

While the preferred embodiments of the invention have been described above, it will be recognized and understood that various modifications may be made therein and the appended claims are intended to cover all such modifications which may fall within the spirit and scope of the invention.

What is claimed is:

1. A collapsible device for a baby carriage comprising:
   a protective lateral rod pivotally connected between a front wheel rod and an inverted U-shaped push rod;
   two locking discs providing male joints firmly fixed with bottom ends of the inverted U-shaped push rod, each locking disc having
   a) two spaced fitting grooves for two tenons of a locking block to fit therein, and
   b) an opening between said two fitting grooves for an upper end of said front wheel rod to fit therein;
   two female joints combined with opposite ends of said protective rod, each female joint having
   i) a hollow chamber to receive said locking block which is biased elastically by a coil spring to fit within and move back and forth therein,
   ii) a fork portion with a middle opening to receive said locking disc therein by means of a pivot pin thereby connecting said fork portion with said locking disc,
   iii) a vertical opening in a bottom and two projecting ridges at both sides of said vertical opening to receive a guide block having two grooves to cooperate with said projecting ridges, and
   iv) a hole in one side thereof to receive a push button having a guide post with a sloped end surface;
   said locking block combined between said locking disc and said female joint, extending and moving in said hollow chamber of said female joint, and each locking block having
   aa) said two tenons at both sides of a rear end to engage or disengage from said two spaced fitting grooves of said locking disc,
   bb) a sloped surface at a side thereof to contact said sloped end surface of said guide post of said push button so that said locking block can be pushed back by said push button from
     1) a locked position wherein said tenons engage said grooves of said locking disc, to
     2) an unlocked position wherein said tenons disengage from said fitting grooves when said push button is pressed in said hole of said female joint, and
   cc) a sloped down surface contacting a top sloped surface of said guide block for said locking block to be guided, thereby to move back and forth therein; and
   said push button being manually pressed in to force said locking block to move to said unlocked position from said locked position, whereby said front wheel rods are allowed to be swung up relative to said inverted U-shaped push rod to collapse said baby carriage.

* * * * *